Patented Nov. 5, 1935

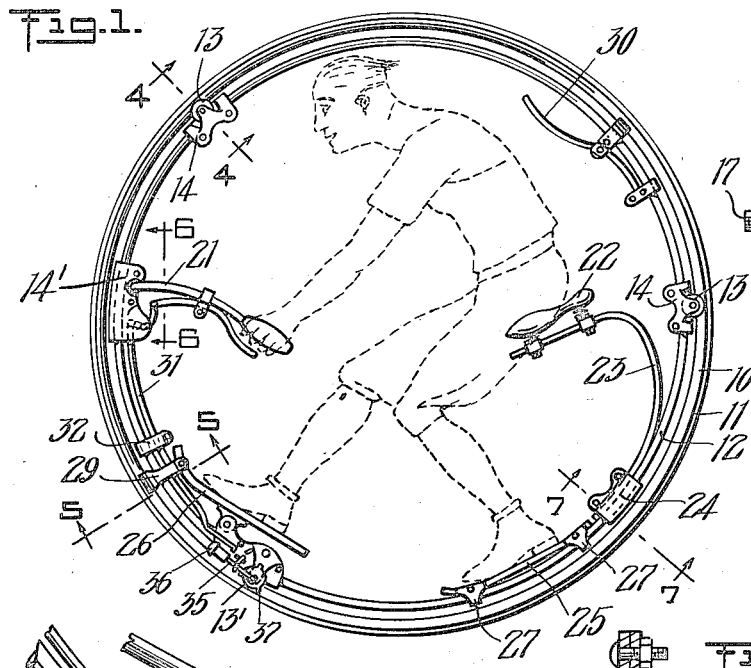

2,019,728

UNITED STATES PATENT OFFICE 2,019,728

UNICYCLE

John V. Ranck, Mountain Lakes, N. J.

Application April 5, 1934, Serial No. 719,080

5 Claims. (Cl. 208—1)

Among the principal objects which the present invention has in view are: To provide an improved unicycle; to provide means whereby the operator can operate the unicycle without the necessity of applying his hand or foot externally of the apparatus; to utilize a relative actuation between two wheels in propelling the apparatus; to employ a brake for bringing the apparatus to a stop; to provide means whereby the apparatus can jump and/or hurdle over objects in the road; to enable the apparatus to be passed over obstacles without requiring the operator to first bring the apparatus to a stop or remove himself from the apparatus; to attach the various parts making up the mechanism to the inside wheel of the apparatus; to provide means between the two wheels whereby the wheels may have a relative rotation one with respect to the other; and to secure simplicity of construction and operation.

In the drawing:

Figure 1 is an elevation of my improved apparatus, showing the same in operable position, and embodying the features of the invention;

Figure 2 is an enlarged fragmentary elevation of one part of the mechanism utilized;

Figure 3 is a sectional view shown as taken on line 3—3 of Figure 2;

Figure 4 is a sectional view of the revolving means, shown as taken on line 4—4 of Figure 1;

Figure 5 is a cross-sectional view taken on line 5—5 of Figure 1;

Figure 6 is an elevation partly in section showing the handle bars as clamped to one wheel, said elevation and section shown as taken on line 6—6 of Figure 1; and Figure 7 is a cross-sectional view of the seat post as clamped to the one wheel, the section shown as taken on line 7—7 of Figure 1.

As seen in the drawing the reference numeral 10 indicates an outer hoop or wheel which in cross-section is preferably round, the central portion being hollow so as to insure easy riding and lightness in weight whereby the apparatus may be easily carried when not in use. Around the outer edge of said hoop or wheel 10, I have provided a rubber casing 11 and extending over the entire periphery thereof. This rubber casing may be cemented to the wheel if preferred, though I do not wish to restrict myself to the specific structure. Concentrically within the wheel 10 I have provided a second wheel 12 which in diameter is slightly smaller so as to allow for a clearance between the outer edge thereof and the inner edge of the outer wheel 10. In construction the said inner wheel likewise is ring-shaped as well as having a hollowed core or tubular cross-section.

For securing the wheels 10 and 12 together in working relationship with respect to each other, there is provided a plurality of rollers 13. In the particular showing of the accompanying drawing, said rollers 13 are preferably spool-shape in construction and curved inwardly from their outer edges to fit within the curvature of the inner periphery of the outer wheel 10. Said rollers 13 are secured by suitable means to the inner wheel 12, such means being here illustrated as in the form of clamps 14, one part of which encircles the inner wheel 12 and is tightly clamped together thereto by a bolt 15 and nut 16, as seen in Figure 4. To insure freedom of movement, the roller 13 is mounted on said clamp 14 by a pin or axle 17 passing through the middle thereof and extending from one side of the clamp to the other side. Said axle being held against displacement by means of lock nuts 18 on the outer sides of the clamp. A roller bearing 19 likewise houses the pin or axle 17 and is provided with a ball race 20 whereby when the apparatus is in use, even rolling will take place. In the present showing three such rollers are provided, though more may be employed, depending on the size of the wheels.

Means are provided for the operator to hold onto when the apparatus is in use, said means also conveniently constituting a balancing medium. Such means may be in the form of handle-bars 21, attached to the inner wheel 12 by use of a clamp 14' similar to the clamps 14 for the rollers 13.

A seat 22 suitably spaced radially inward of the inner wheel 12 and substantially diametrically opposed to the handle bars is provided whereby the operator may conveniently and comfortably operate the apparatus. Said seat is secured at its inner end to a rod 23 of preferably tubular construction, said rod at its other or outer end being attached to the inner wheel 12 by being clamped thereto, as at 24 as shown in Figure 7. The construction of said clamping means may for convenience be the same as heretofore described for the rollers and handle-bars.

A pair of foot rests 25, and 26 spaced circumferentially and substantially beneath the seat and handle-bars respectively, are provided on the bottom of the inner periphery wheel 12. The one foot rest 25 may be permanently and immovably attached to the wheel as by a pair of clamps 27. The other foot rest 26 is pivotally attached as at 28 thereby allowing its ends to swing in an upward and downward direction. The forward end of said foot rest 26 is provided with means for effecting engagement with the outer wheel 10. The means shown comprises a U-shaped member 29, the upper ends of the arms of which are pivoted to the forward end of the treadle, and the cross-connecting portion of which passes freely between the two wheels. This cross-connecting portion is likewise preferably concave outward so as to provide a fitting and frictional engagement with the inner circumference of the outer wheel when desired. Depression of the outer end of the treadle therefore causes both wheels to roll together.

In operation the user before seating himself within the apparatus places his left foot on the foot rest 25 and with his other foot gives a slight shove forward whereby the outer wheel revolves. When momentum has been obtained the operator then leaps onto the seat 22, places his right foot on the foot rest treadle 26, then moves his body in a forward motion and at the same time applies pressure on the foot rest treadle 26, that is to say the toe portion of the foot presses down on the forward part of said foot rest thereby causing the U-shaped member 29 to engage with the revolving wheel 10. The operator also swings his body forward during this clutch-engaging period, causing both wheels to rotate together through a short distance, after which he releases the clutch pressure and rocks his body rearwardly, during which time the wheels are rotating in opposite directions, the outer one continuing the forward rotation at all times. The forward and backward movement of the operator's body permits propelling and added speed to the apparatus.

Should the operator desire to retard forward movement of the apparatus or stop it, he straightens his body which then engages with a member 30. In pressing against this member, the said member is adapted frictionally to hold the inner wheel 12 in contact with the outer wheel 10 thereby preventing relative rotation between the two wheels.

An added feature of the present invention is that when the apparatus is in motion it may be caused to hurdle over holes or objects in the road, thereby giving added thrills to the user. An example of a means by which hurdling is accomplished, may conveniently comprise a lever 31 pivoted to one of the handle bars 21, preferably the right handle bar. This lever is permitted to slide in an upwardly and downwardly direction on the inner periphery of the wheel 12, it being prevented from becoming disconnected from the wheel by the handle bar clamp, and a lug 32 adjacent the U-shaped member 29. This lever is forked at its lower end and terminates into a knob-like shape 31' and approximated at the pivotal point of the foot rest treadle 26 where it contacts a swinging member 33.

The clamping member for the foot rest 26 on one side is provided with a protruding member or shelf 34 (see Figures 2 and 3) and it is on this member that the swinging member 33 rests. The axle on which the rollers 13 and 13' is mounted and on which said roller revolves, in this instance is provided with extendible ends 35. The outer ends of this axle are provided with cushioning means such as solid rubber heads 36. The swinging member 33 is pivotally secured to the extendible end 35 approximately midway between the outer end and the roller. When the operator wishes to hurdle, he presses on the lever 31 with his right hand which then causes the knob 31' on the forked end to push forward against a portion of the swinging member 33 resting on the protruding member or shelf 34. The extendible ends 35 then drop at a rate of speed the roller 13' is travelling and as it strikes the surface, the apparatus leaps off the ground. It is to be noted that the roller 13' in this instance is provided with a plurality of teeth 37, preferably three in number and spaced equally apart, so that as the hurdling member 35 is dropped through operation of the lever 31, the swinging member 33 is carried by one of the teeth, and as the roller makes one complete revolution, it carries with it the hurdling member.

To return the swinging member 33 to the shelf 34, I have shown another protruding member 38 similarly struck out from the clamp, and as the one end of the swinging member reaches the outer edge of said protruding member 38, it is released from the tooth on which it is being carried and then slid onto the shelf 34 until the lever 31 is again operated to release it.

Obviously detail changes and modifications may be made in the construction carrying out my invention, and I do not wish to be limited thereto except as set forth in the following claims.

I claim:

1. An apparatus as characterized comprising a pair of circular rotatable spokeless wheels one within the other, a plurality of rollers attached to the inner wheel and adapted to engage the inner periphery of the outer wheel, a foot treadle pivoted to the inner wheel, and a clutch pivotally mounted to said foot treadle whereby downward movement of said treadle will cause said clutch to engage the outer wheel for giving a pushing moment to the same in operation.

2. An apparatus as characterized comprising a pair of circular rotatable spokeless wheels one within the other, a plurality of rollers attached to the inner wheel and adapted to engage the inner periphery of the outer wheel, a seat radially spaced inward of the said inner wheel, a pair of handle bars projecting inwardly of the inner wheel whereby an operator can seat himself on the seat and grasp said handle bars, a foot treadle pivoted to said inner wheel, a clutch pivotally mounted to the forward part of the said treadle adapted to engage the inner periphery of the outer wheel as the operator swings his body in a forward direction his foot pressing downwardly on the treadle for transmitting a pushing movement to said outer wheel whereby said outer wheel will rotate forwardly, and a foot rest attached to the inner wheel substantially beneath the seat whereby the other foot of the operator can rest while the apparatus is in motion.

3. An apparatus as characterized comprising a pair of circular rotatable spokeless wheels one within the other, a plurality of rollers attached to the inner wheel and adapted to engage the inner periphery of the outer wheel, a seat radially spaced inward of the said inner wheel, a pair of handle bars projecting inwardly of the inner wheel whereby an operator can seat himself on the seat and grasp said handle bars, a foot treadle pivoted to said inner wheel, a clutch pivotally mounted to the forward part of the said treadle adapted to engage the inner periphery of the outer wheel as the operator swings his body in a forward direction his foot pressing downwardly on the treadle for transmitting a pushing movement to said outer wheel whereby said outer wheel will rotate forwardly, and a foot rest attached to the inner wheel substantially beneath the seat whereby the other foot of the operator can rest while the apparatus is in motion, and means for engaging the ground for causing the apparatus to hurdle while said apparatus is in motion.

4. An apparatus as characterized comprising a pair of circular rotatable spokeless wheels one within the other, a plurality of rollers attached to the inner wheel and adapted to engage the inner periphery of the outer wheel, a seat radially spaced inward of the said inner wheel, a pair of handle bars projecting inwardly of the inner wheel whereby an operator can seat himself on the seat and grasp said handle bars, a foot treadle pivoted to said inner wheel, a clutch pivotally mounted to the forward part of the said treadle adapted to engage the inner periphery of the outer wheel as the operator swings his body in a forward direction his foot pressing downwardly on the treadle for transmitting a pushing movement to said outer wheel whereby said outer wheel will rotate forwardly, and a foot rest attached to the inner wheel substantially beneath the seat whereby the other foot of the operator can rest while the apparatus is in motion, and means operable from said handle bars for engaging the ground for causing the apparatus to hurdle while said apparatus is in motion.

5. An apparatus as characterized comprising a pair of circular rotatable spokeless wheels one within the other, a plurality of rollers attached to the inner wheel and adapted to engage the inner periphery of the outer wheel, a seat radially spaced inward of the said inner wheel, a pair of handle bars projecting inwardly of the inner wheel whereby an operator can seat himself on the seat and grasp said handle bars, a foot treadle pivoted to said inner wheel, a clutch pivotally mounted to the forward part of the said treadle adapted to engage the inner periphery of the outer wheel as the operator swings his body in a forward direction his foot pressing downwardly on the treadle for transmitting a pushing movement to said outer wheel whereby said outer wheel will rotate forwardly, and a foot rest attached to the inner wheel substantially beneath the seat whereby the other foot of the operator can rest while the apparatus is in motion, a lever on one of said handle bars, said lever extending downwardly along the inner periphery of the inner wheel to approximately beneath the said treadle, and means extending from one of said rollers whereby the lever in operation engages with said means to release the same therefrom and adapted to cause the apparatus to hurdle as said means comes in contact with the ground.

JOHN V. RANCK.